Sept. 24, 1929.   H. A. COURMETTES   1,729,066
BIFOCAL LENS AND METHOD OF MAKING THE SAME
Filed July 25, 1927
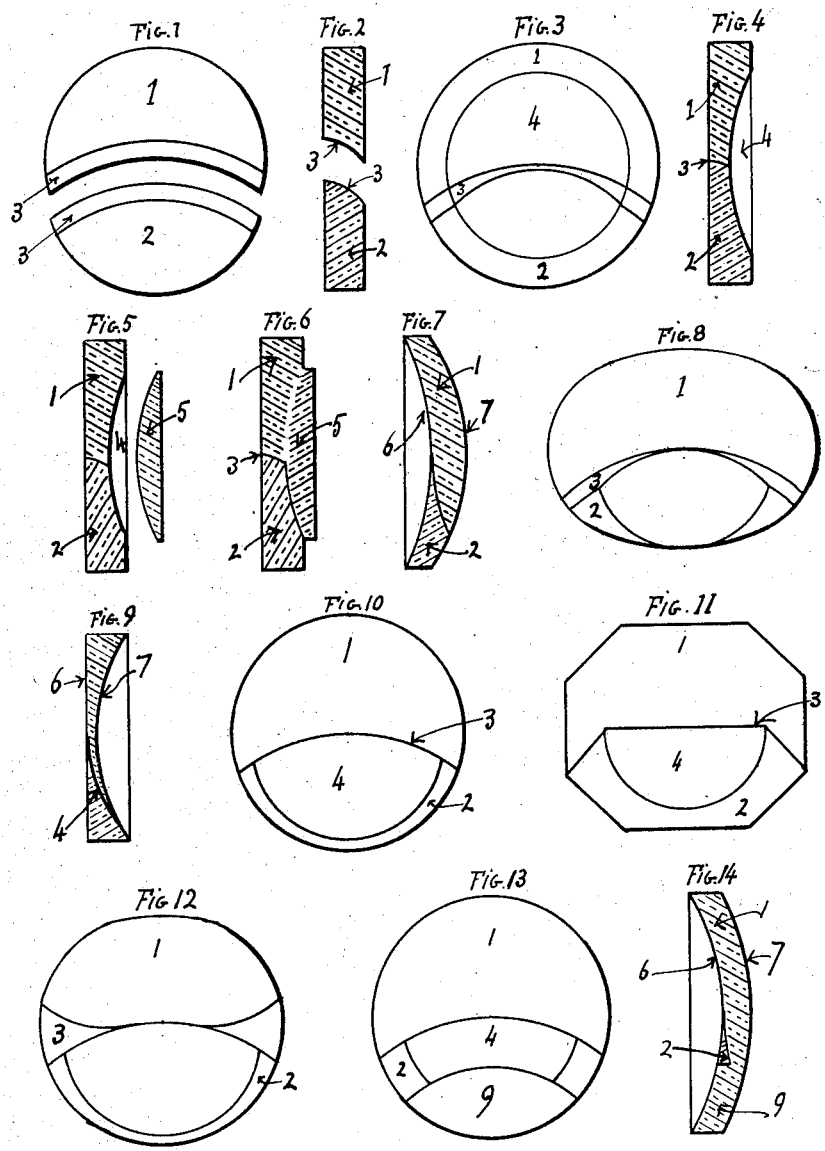
INVENTOR.

Patented Sept. 24, 1929

1,729,066

UNITED STATES PATENT OFFICE

HENRY A. COURMETTES, OF BROOKLYN, NEW YORK

BIFOCAL LENS AND METHOD FOR MAKING THE SAME

Application filed July 25, 1927. Serial No. 208,259.

The objects of my invention are to produce an entirely new type of bifocals of the fused type or variety, the exposed surfaces of which are ground with even curvatures and embodying numerous advantages fulfilling the following conditions, namely:

1. To make it possible to locate the position of the optical center of the power added to the main lens to make up the near or reading portion of the lens at or about the line dividing the upper from the lower fields, at the same time making that part of the said line nearest the geometric center of the lens least visible and thinnest.

2. To arrange the various components of the lens in such way as to have the upper or distant portion of the lens ground on the glass having the greatest index of refraction, thereby reducing the curvatures and thickness of the main lens to a minimum.

3. To provide a lens of such construction which permits making a much thinner lens of the concave type for a given size of near portion.

4. To provide a transition zone extending on both sides of the near or reading portion in the lens described for the purpose of preventing undesirable reflections and refractive changes.

5. To provide a multifocal lens having all of the above advantages.

6. To provide a new method of making a bifocal having an area below the near field to permit the wearer to see clearly at a distance of the floor as in walking, said area being approximately of the same power as that of the upper or distant field.

7. To simplify the difficulties in fusing lenses of such types.

The method used in obtaining the objects mentioned consists essentially in forming a main or major lens blank by welding together edge to edge two pieces of glass having different refractive indices; grinding a depression in the thus formed major lens blank and fusing into said depression a minor lens having the same index of refraction as that of the highest refractive portion of the major lens, the result being the neutralizing of that part of the depression in the main lens having the greatest refractive index and leaving a difference in refractive power in that part of the depression in the major lens having the lowest refractive index; grinding down the exposed surface of the major lens opposite that of the depression until the thickness of the welded edges of the two members of the major lens have been reduced to the minimum at the point nearest to the center of said major lens, and finishing the remaining exposed surface so as to leave a portion of the minor lens imbedded in said major lens and of such curvatures as to provide the desired powers for the various portions.

Reference is made to the drawings herewith forming a part of the invention in which similar numbers refer to similar parts throughout and in which:

Fig. 1 is a front face view of the two members used in the making of the major lens blank.

Fig. 2 is a sectional side elevation of Fig. 1.

Fig. 3 is a front view of the major lens blank into which a spherical depression has been ground.

Fig. 4 is a sectional side elevation of Fig. 3.

Fig. 5 is a sectional elevation of the major and minor lenses ready before the final fusing.

Fig. 6 is a sectional elevation of the major and minor lenses after all fusing has been completed but before the outer surfaces are finished.

Fig. 7 is a sectional elevation view of a finished lens.

Fig. 8 is a front view of a finished lens showing the two main fields and transition zone.

Fig. 9 is a sectional elevation of a highly concave lens showing the comparatively shallow depression.

Fig. 10 is a front view of a finished lens wherein the two fields are not separated by a transition zone due to the fact that in the making of the major lens blank the adjoining edges of its two members were not inclined but ground at right angle to the outer surfaces.

Fig. 11 is a front face view of an octagonal finished lens provided with odd shaped lower fields suitable for such lens.

Fig. 12 is also a front face view of a finished lens in which the transition zone was made of a peculiar outline by an irregular curve and inclination at the adjoining edges of the two major members.

Fig. 13 is a face view of a multifocal lens.

Fig. 14 is a sectional elevation of Fig. 13.

From the description of the method it is shown that the first condition to be fulfilled is obtained by the fact that the depression extends into the two major members, the different refractive indices of which have caused only one part of the depression to remain visible in the finished lens; the different parts of the depression are not necessarily of the same size or shape, but such as to control the position of the optical center and shape of the near or minor portion desired in the finished lens, and by virtue of the grinding process gradually reducing the thickness of the major lens toward its center in grinding the depression and the further reducing of this thickness in the finishing process of the opposite exposed outer surface of the major lens, it is apparent that the line separating the upper from the lower fields in the finished lens has been reduced almost to invisibility in the center and most useful part of the bifocal.

The second condition is also fulfilled by the fact that the major lens is composed of two parts, the upper one having the highest index of refraction being the one used for the distant field in the finished lens.

For the third condition, considering lenses for the correction of high degrees of myopia where a strong concave lens is used and very often the greatest power of addition for the near field is required such as for example a prescription calling for "Dist. —10. diopters, reading add +4.00 diop. to above"; it is easy to conceive without going into calculations that the ordinary glasses used in the making of fused bifocals would already provide in this instance a difference of about 2 diopters between the upper and lower components of the major lens after grinding the distant power upon it consequently leaving only a +2. diopters instead of a +4.00 to be supplied by the minor lens and the depression for this power would obviously be only one half as deep as would be required for a +4.00 diopters thereby making this lens, as well as any other cancave combination, thinner than could be possible otherwise. In this simple example it is assumed that the refractive indices of the major members are 1.60 for the upper and 1.50 for the lower, and the minor lens 1.60 or other indices of such ratios.

The shape of the contiguous edges of the component parts in the main lens can be curved downward as an arch, or straight across, curved or shaped in different directions to suit any individual desire and the welded edges themselves can be inclined or ground spherical, conical, toroidal or irregular in surface and form as may be necessary for the prevention of undesirable reflects or a creation of a transition zone gradual in width to the sides and boundary of the near field of the lens, thereby satisfying condition four.

The fifth and sixth conditions are obtained by the addition of a third member to form the major lens blank, such as a glass of low index of refraction interposed between and welded to two components of higher refraction index and grinding the depression so as to include a part of each component into which the minor lens is fused, the result in the finished lens being a multifocal or bifocal as in conditions 5 and 6 with or without the transition zone as in condition 4.

Referring to condition 7; in types of fused bifocals where the optical center of the minor lens is controlled by some method other than this, the task of fusing the minor lens has always been a difficult one, in those depending upon a composite minor lens made up of two or more members, due to the different fusing points of the various glasses an uneven fusing into the depression takes place along the edges joining the various members of the composite minor lens often making a gradual fusing into the depression impossible before some air spaces or bubbles have been sealed in the depression by this uneven fusing.

In this new method the minor lens being of one kind and single solid piece of glass, no difficulty in welding into the depression is experienced as a gradual fusing from any part of the depression can be controlled at will by the use of methods well known to the art.

The word depression used throughout is not confined to a concave curve only but to any surface either concave, flat or convex which would be comparatively lower than the level of the exposed surface into which the minor lens is fused.

One of the many combinations possible with this invention is shown in Fig. 8 where the transition zone is of a size not larger than necessary to provide the inclination of the welded edges sufficient to avoid visible reflections. This type is especially well adapted for bifocals by reason of its downward curve of the minor lens, large distant field and general appearance.

In some cases the adjoining faces of the two members in the major lens can be left semitransparent by omitting the polishing before welding them together.

The glass of higher refractivity in the major lens is purposely selected of the hard kinds such as barium crown to have good wearing quality, to resist scratches as well as diminish chromatic abberations, although ordinary flint or lead oxide glass can be used successfully.

Although this lens will make a perfect monocentric or monoaxial bifocal, yet for all practical purposes I prefer to have the optical center of the distant field in the geometric center of the finished lens and the optical center of the added power for the lower field under the division line to the extent of fully one half the diameter of the pupil of the wearer, especially in the type having the arched shape lower field.

Where prevention of the redoubling or so-called jump effect at the line dividing the two main fields is essential, I find that the optical center of the added power for the lower field should be below the upper field to the extent of one quarter the diameter of the pupil of the wearer to cause parallel rays entering the eye through both fields of the lens to come to the retina where those rays having passed through the distant field have come to a focal point and those parallel rays which have passed through the lower field form a circle of diffusion exactly superimposed over the focal point of the former.

The applicant conceives the possibility of obtaining the various results given by forming the major blank by other methods, such as, superimposing two plates of glass of different refractive indices and grinding away obliquely from each surface so as to leave a main lens which would have an upper glass of one index, a lower glass of a different index and a zone created by the faces which were welded together to form the major lens blank.

It is understood that by making the minor lens of the same index of refraction as that of the major member which has the lowest refractive index, a bifocal would result having a comparatively minus power in the part of the depression visible in the finished lens.

A piece of glass 1 of comparatively high refractive index and a piece of glass 2 of a lower index of refraction Fig. 1 are shaped along their edges 3 by molding or grinding so that both edges 3, Fig. 2, fit well when brought together; when in this position the two members 1 and 2 are joined by fusing, thereby forming an homogeneous major lens blank into which a depression 4, Fig. 3, is ground at about the central portion of the major lens so as to include a part of both members 1 and 2; a minor lens 5, Fig. 5, having the same index of refraction as that of glass member 1 is surfaced so as to fit into depression 4 and fused thereto to form the solid blank Fig. 6, the outer surface 6 is then surfaced until the line 3 uniting the two major members has been made infinitely thin at its center for the purpose of making it as invisible as possible in the finished lens Fig. 7; the remaining surface 7 is then finished to the thickness and power desired.

In practice it has been found advantageous to vary the difference in refractive indices of the two major members according to the additional power and size of near field required.

The edges 3 have been purposely shown as curved and inclined to produce the lens shown in Fig. 8 wherein the transition zone 3 is none other than that caused by the said inclined edges 3 Fig. 2. This inclination can be regulated to make the transition zone whatever size power or form is desired, mostly any combination of curves can be used, but in the type shown in Fig. 9 the surfaces 6 and 7 combine to make a strong concave lens for the upper portion and in this form the depth of the depression 4 for reasons explained before is comparatively shallow and therefore most suitable to make a reasonably thin concave lens. Although this lens also could have a transition zone, it is shown in Fig. 10 as having a sharp line dividing the two main fields, in this case the edges 3 were ground at right angle to the outer surface 6 Fig. 9.

The resultant appearance of two lenses is given in Figs. 11 and 12 where the shapes, inclinations and curves of the edges 3 have been made to cause the effect.

The major lens blank can also be formed of three members as in Fig. 13, 1, 2 and 9 and the process completed as before. This is shown to result in a lens having three main fields.

I am aware that various types of fused bifocals have been made, but I am not aware that any bifocal embodying the many advantages shown above has ever been made before, therefore

I claim:

1. An integral bifocal lens comprising, a major lens blank made of two glass members of different indices of refraction, the upper member having the highest refractive index; a depression ground into said major lens blank so as to include a part of both members, and a minor lens fused therein having the same index of refraction as that of the upper glass member of the major lens blank, as set forth.

2. An integral bifocal lens comprising, a major lens blank formed by fusing edge to edge two glass members of different indices of refraction; a depression ground into said major lens blank to include part of each major member, and a minor lens fused therein having the same index of refraction as that of one of the members of the major lens blank as set forth.

3. An integral bifocal lens comprising, a major lens blank formed by fusing edge to edge two glass members of different indices of refraction, said edges being ground at an angle oblique to the outer surfaces of the major lens blank and spherical; a depression ground into said major lens blank and a minor lens fused therein having the same index of refraction as that of one of the major members as set forth.

4. An integral bifocal lens ground with even exposed surfaces comprising, an upper field for distant vision, a lower field for near vision, and a blind transition zone separating the two fields, said zone varying in width, being narrowest at the central upper boundary of the lower field and increasing along said boundary to the edges of the lens as set forth.

5. An integral multifocal lens comprising, a major lens blank formed by welding edge to edge a plurality of glass members of different refractive indices, a depression ground into said major lens blank covering a part of each glass member, and a minor lens welded into said depression and having a refractive index similar to that of one of the members of the major lens blank.

6. An integral bifocal lens comprising, a major lens blank formed by joining a glass member of relatively lower index of refraction interposed between and welded to two component glass members of higher refractive index; a depression ground into said major lens blank to cover a part of each of its components and a minor lens fused therein having a similar index of refraction as that of the major component members of higher refractive index as set forth.

7. The method of making the optical lens mentioned herein consisting in, forming a main or major lens blank by welding together edge to edge two glass members having different refractive indices, the faces of said edges being preferably spherical but oblique to the outer surfaces of the major lens blank; grinding a depression in the thus formed major lens blank to include a part of each of its component members and fusing into said depression a minor lens having the same index of refraction as that of the highest refractive member of the major lens; grinding down the exposed surface of the major lens opposite to that of the depression until the thickness of the welded edges in the major lens has been reduced to the minimum at its central portion, and finishing the remaining exposed surface so as to leave the minor lens imbedded in the major lens and of such curvature as to provide the described focal powers for the finished lens.

8. The method of making the lens as set forth, consisting in, forming a main or major lens blank by uniting together a plurality of glass members of various refractive indices; grinding a depression in said major lens blank and fusing therein a minor lens having the same referactive index as that of at least one of the glass members in the major lens blank; grinding down the exposed surface of the major lens opposite to that of the depression until the thickness of the adjoining edges in the major lens has been reduced to the minimum, and finishing the remaining exposed surface so as to leave the desired size and shape of the minor lens imbedded in the major lens and of such curvature as to provide the powers desired.

In testimony that I claim the foregoing as my invention, I have hereunto signed my name this twenty first day of July 1927.

HENRY A. COURMETTES.